UNITED STATES PATENT OFFICE.

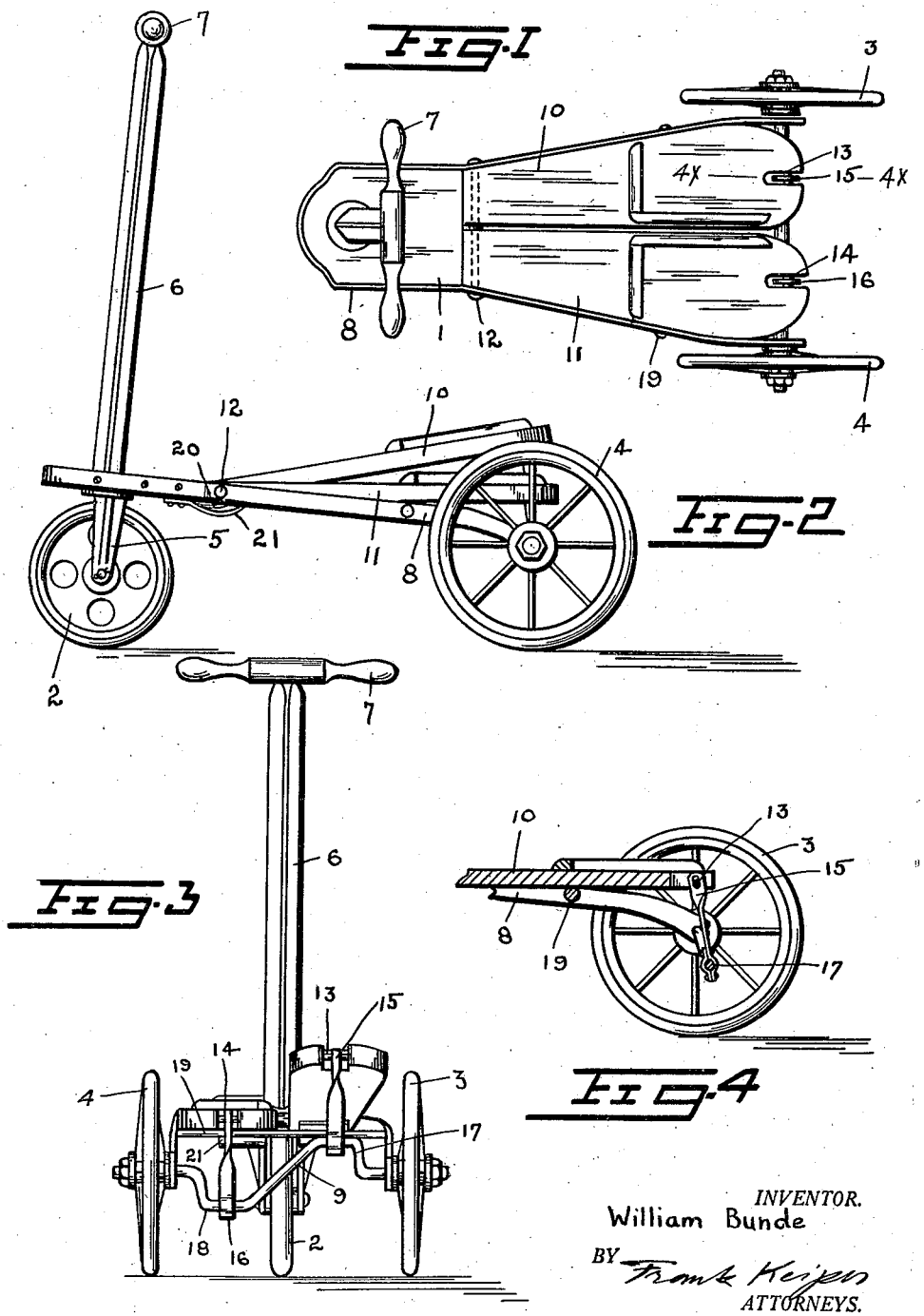

WILLIAM BUNDE, OF ROCHESTER, NEW YORK.

SCOOTER CAR.

1,423,994.  Specification of Letters Patent.  Patented July 25, 1922.

Application filed June 2, 1921. Serial No. 474,565.

*To all whom it may concern:*

Be it known that I, WILLIAM BUNDE, a citizen of the United States, residing at Rochester, in the county of Monroe and State of New York, have invented certain new and useful Improvements in Scooter Cars, of which the following is a specification.

The object of this invention is to provide a new and improved type of scooter car for children.

This and other objects of this invention will be fully illustrated in the drawing, described in the specification, and pointed out in the claims at the end thereof.

In the accompanying drawing:

Figure 1 is a top plan view of the car.
Figure 2 is a side elevation of the car.
Figure 3 is a rear elevation of the car.
Figure 4 is a detail sectional view through a portion of the rear end of the car showing part of the driving mechanism, the section being taken on the line $4^x$—$4^x$ of Figure 1.

In the several figures of the drawing like reference numerals indicate like parts.

Scooter cars are vehicles that comprise a platform supported by two or more wheels close to the surface over which they are driven. The operator of a scooter car stands on the platform and steers it by means of a vertical or nearly vertical steering post that extends up from the platform near the front end thereof and is adapted to turn the front or steering wheel of the car. The simpler forms of these cars are propelled by one foot of the operator who stands with the other foot on the platform balancing himself thereon while he steers the car and pushes it ahead with the other foot until the car reaches a sufficient momentum that permits a coasting of the car when he can place both of his feet on the platform until the momentum of the car has spent itself so that it has to be propelled again by the foot of the operator.

In the scooter car forming the subject matter of this invention the operator is not required to operate the car by pushing it ahead with one foot. This car comprises the platform 1 supported at the front by the steering wheel 2 and at the rear by the driving wheels 3 and 4.

The steering wheel 2 is mounted in the fork 5 which is swiveled on the under side of the platform 1 near the front end thereof. Connected to the fork 5 for the purpose of rotating same is the steering post 6 having the handle 7 formed at the upper end thereof. The platform 1 is bound with the band iron 8 which encircles the front end of the platform and extends to the rear of the car at each side of the platform and has suitable bearings provided at the ends thereof in which the crank shaft 9 is adapted to rotate. The frame formed by the band iron 8 increases in width toward the rear of the car and is slightly inclined with the highest point of the frame near the front in which the steering post is mounted.

The rear end of the frame formed by the band iron is curved downwardly in order to place the bearings for the crank shaft at a lower level than that of the inclined platform. A wheel of suitable diameter can therefore be used to support the rear end of the car, one that does not project too far above the platform or frame of the car.

It is only the front portion of the platform in which the steering post is mounted that is stationary with the frame formed by the band iron. The rear of the platform is made up of a pair of swinging pedals 10 and 11 mounted to rock on the shaft 12 that is supported between the side of the frame formed by the band iron at a point close to the rear end of the stationary portion of the platform 1. Each of these pedals is slotted at the rear end and the pins 13 and 14 are mounted in the slot of each of the pedals respectively. The connecting rods 15 and 16 are connected to these pins respectively and connect the rear of each of the pedals to the cranks 17 and 18 formed on the crank shaft 9. The hole in the upper end of each of the connecting rods 15 and 16 is slightly enlarged or made oblong so that the pedals 10 and 11 can rest on the cross brace 19 mounted in the frame before the cranks have reached the dead center. This allows the connecting rods to have a slightly further downward motion that moves the crank to the dead center and a corresponding slightly upward movement to bring the crank past the dead center, as illustrated in Figure 4.

Attached with one end to the under side of the stationary portion of the platform are a pair of bow springs 20 and 21. These springs extend rearwardly and the free ends thereof are forced against the under side of the pedals 10 and 11 respectively at a point to the right of the shaft 12 on which the pedals are mounted to swing. The force exerted by the ends of the springs on the pedals tend to slightly lift these pedals when the weight of the operator is taken off therefrom. The function of these springs is therefore as follows: The cranks 17 and 18 are 180 degrees spaced apart so that one of the pedals is at its highest position when the other is at its lowest position. To operate the car the child stands on the pedals and places his weight on the foot that stands on the pedal occupying its highest position. This forces the pedal down and in so doing rotates the crank shaft 180 degrees. At the same time one of the pedals is forced down by the weight of the operator the other of the pedals is raised until it reaches its highest position, when the other pedal has reached its lowest position. This is made possible because the operator has placed all of his weight on the downwardly moving pedal allowing the other to move upwardly against practically no resistance.

To avoid having the cranks dead center on the downward stroke of the connecting rods a stop is provided by the rod 19. This stop arrests the movement of the pedals at a point before the connecting rods have reached the dead center leaving it to the momentum of the wheel to move the crank further without the assistance of the force exerted by the pedals. The enlarged openings in the connecting rods permit this additional movement of the connecting rod and the crank, and when the dead center has been passed the action of the bow springs operate to move the pedal upwardly assisting the crank in raising the connecting rod. This is possible because on the upward movement the weight of the operator is taken off from the pedal. In this way the operator of the car cannot get the cranks dead centered so that a smooth and even driving of the car is secured by simply shifting the weight from one foot to the other to force the raised pedal down and allow the lowered pedal to raise.

I claim:

1. In a scooter car the combination of a frame, a stationary platform mounted at one end of said frame, a pair of pedals mounted to swing in the other end of said frame, a steering fork mounted to rotate in said stationary platform, a wheel mounted on the end of said steering fork and supporting said stationary platform, a crank shaft mounted at the rear end of said frame, a wheel at each end of said crank shaft adapted to support the rear of said frame, connecting rods between the free end of each of said pedals and said crank shaft, each of said connecting rods having a loose fit with said pedals to permit a lost motion thereof, and means to throw said crank shaft past the dead center on the downward movement of said pedals.

2. In a scooter car, the combination of a frame, a stationary platform mounted at one end of said frame, a pair of pedals mounted to swing in the other end of said frame, a steering fork mounted to rotate in said stationary platform, a wheel mounted on the end of said steering fork and supporting said stationary platform, a crank shaft mounted at the rear end of said frame, a wheel at each end of said crank shaft adapted to support the rear of said frame, connecting rods between the free end of each of said pedals and said crank shaft, a cross brace at the rear end of said frame, said brace being adapted to support said pedals and stop their movement before the connecting rods thereof are dead centered on said crank shaft.

3. In a scooter car, the combination of a frame, a stationary platform mounted at one end of said frame, a pair of pedals mounted to swing in the other end of said frame, a steering fork mounted to rotate in said stationary platform, a wheel mounted on the end said steering fork and supporting said stationary platform, a crank shaft mounted at the rear end of said frame, a wheel at each end of said crank shaft adapted to support the rear of said frame, connecting rods between the free end of each of said pedals and said crank shaft, a cross brace at the rear end of said frame, said brace being adapted to support said pedals and stop their movement before the connecting rods thereof are dead centered on said crank shaft, a pair of springs mounted on the underside of said stationary platform and acting against the under side of said pedals to raise and move said pedals past the lower dead center on said crank shaft.

In testimony whereof I affix my signature.

WILLIAM BUNDE.